US012567411B2

(12) United States Patent
Gao et al.

(10) Patent No.: US 12,567,411 B2
(45) Date of Patent: Mar. 3, 2026

(54) VOICE INTERACTION METHOD AND ELECTRONIC DEVICE

(71) Applicant: Huawei Technologies Co., Ltd., Shenzhen (CN)

(72) Inventors: Wenmei Gao, Shenzhen (CN); Henghui Lu, Beijing (CN); Yuewan Lu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 184 days.

(21) Appl. No.: 18/278,665

(22) PCT Filed: Dec. 17, 2021

(86) PCT No.: PCT/CN2021/139315
§ 371 (c)(1),
(2) Date: Aug. 24, 2023

(87) PCT Pub. No.: WO2022/179269
PCT Pub. Date: Sep. 1, 2022

(65) Prior Publication Data
US 2024/0127813 A1 Apr. 18, 2024

(30) Foreign Application Priority Data

Feb. 26, 2021 (CN) .......................... 202110223033.2

(51) Int. Cl.
*G10L 15/30* (2013.01)
*G06F 3/16* (2006.01)
(Continued)

(52) U.S. Cl.
CPC .............. *G10L 15/22* (2013.01); *G06F 3/167* (2013.01); *H04W 4/021* (2013.01); *H04W 4/06* (2013.01); *G10L 2015/223* (2013.01)

(58) Field of Classification Search
CPC ......... G10L 15/22; G10L 15/30; G10L 17/22; G06F 3/167
See application file for complete search history.

(56) References Cited

U.S. PATENT DOCUMENTS

| 10,748,546 | B2 * | 8/2020 | Kim ......................... G10L 15/16 |
| 2017/0206896 | A1 * | 7/2017 | Ko ............................. G06F 3/16 |

(Continued)

FOREIGN PATENT DOCUMENTS

| CN | 1423228 | A | 6/2003 |
| CN | 107452386 | A | 12/2017 |

(Continued)

*Primary Examiner* — Daniel Abebe
(74) *Attorney, Agent, or Firm* — Slater Matsil, LLP

(57) ABSTRACT

This application provides a voice interaction method. For a plurality of electronic devices equipped with a same voice assistant, a voice assistant of only one electronic device is in a working mode, and voice assistants of other electronic devices are all in a silent mode. When a user gives a voice for the voice assistant, the other electronic devices whose voice assistants are in the silent mode do not respond to a first instruction triggered by the voice of the user, only the electronic device whose voice assistant is in the working mode sends, according to the first instruction triggered by the voice of the user, a second instruction to an electronic device that is in the plurality of electronic devices and that has a capability of executing a task requested by the user, and the electronic device that receives the second instruction executes the task requested by the user.

20 Claims, 8 Drawing Sheets

(51) Int. Cl.
  _G10L 15/22_      (2006.01)
  _H04W 4/021_      (2018.01)
  _H04W 4/06_      (2009.01)

(56)                References Cited

U.S. PATENT DOCUMENTS

2018/0204569  A1      7/2018  Nadkar et al.
2018/0342151  A1*  11/2018  VanBlon ................. G06F 3/011
2021/0043189  A1*    2/2021  Pyun ........................ G06F 21/32
2023/0368785  A1*  11/2023  Singh ...................... G06F 3/167

FOREIGN PATENT DOCUMENTS

CN          111968641  A      11/2020
CN          112037789  A      12/2020
KR        20200139883  A      12/2020
WO          2020241906  A1    12/2020

* cited by examiner

Hey Celia! How is the weather today?

It is a fine day today in Beijing

It is a fine day today in Beijing

It is a fine day today in Beijing

Electronic device 100

400

500

VOICE INTERACTION METHOD AND ELECTRONIC DEVICE

CROSS REFERENCE TO RELATED APPLICATIONS

This application is a national stage of International Application No. PCT/CN2021/139315, filed on Dec. 17, 2021, which claims priority to Chinese Patent Application No. 202110223033.2, filed on Feb. 26, 2021. Both of the aforementioned applications are hereby incorporated by reference in their entireties.

TECHNICAL FIELD

This application relates to the terminal field, and more specifically, to a voice interaction method and an electronic device in the terminal field.

BACKGROUND

Currently, in a smart home, a voice assistant has become a core interaction entrance between a user and an intelligent electronic device, and the user may control the intelligent electronic device in the home by using the voice assistant.

As a quantity of intelligent electronic devices in a home increases, user experience is also affected. For example, around a user, there are a plurality of intelligent electronic devices equipped with a same voice assistant. When the user gives a voice for the voice assistant, the plurality of intelligent electronic devices are equipped with the same voice assistant all respond to the user. Therefore, user experience is affected.

SUMMARY

Embodiments of this application provide a voice interaction method and an electronic device. According to the method, a plurality of electronic devices can be prevented from simultaneously responding to an instruction triggered by a voice of a user, and an electronic device that finally responds is enabled to have a capability of executing a task requested by the user, thereby improving user experience.

According to a first aspect, a voice interaction method is provided. The method is performed by a first electronic device in at least two electronic devices, the at least two electronic devices are currently located in a first area, voice assistants equipped on the at least two electronic devices are the same, voice assistants of other electronic devices different from the first electronic device in the at least two electronic devices are in a silent mode, and the method includes: receiving a first instruction triggered by a voice of a user, where the first instruction requests to execute a first task; and sending a second instruction to a second electronic device according to the first instruction, where the second instruction requests the second electronic device to execute the first task, and the second electronic device is one of the other electronic devices.

Based on the foregoing technical solution, for a plurality of electronic devices equipped with a same voice assistant, a voice assistant of only one electronic device is in a working mode, and voice assistants of other electronic devices are all in a silent mode. The working mode means that a voice assistant of an electronic device can receive an instruction triggered by a voice of a user, and respond to the instruction. The silent mode means that a voice assistant of an electronic device can receive an instruction, but does not respond to the instruction. When a user gives a voice for the voice assistant, the other electronic devices whose voice assistants are in the silent mode do not respond to a first instruction triggered by the voice of the user, only the electronic device whose voice assistant is in the working mode sends, according to the first instruction triggered by the voice of the user, a second instruction to an electronic device that is in the plurality of electronic devices and that has a capability of executing a task requested by the user, and the electronic device that receives the second instruction executes the task requested by the user. Therefore, according to the method, the plurality of electronic devices in a smart home can be prevented from simultaneously responding to the instruction triggered by the voice of the user, and an electronic device that finally responds is enabled to have the capability of executing the task requested by the user, thereby improving user experience.

With reference to the first aspect, in some implementations of the first aspect, the method further includes: obtaining reference information, where the reference information indicates an electronic device that the user expects to execute the first task. The sending the second instruction to a second electronic device according to the first instruction includes: sending the second instruction to the second electronic device according to the first instruction and the reference information.

Based on the foregoing technical solution, the first electronic device may determine, based on the reference information and the first instruction, that the second electronic device executes the first task, and send the second instruction to the second electronic device, so that the second electronic device is an electronic device that the user expects to execute the first task, thereby improving user experience.

With reference to the first aspect and the foregoing implementations, in some implementations of the first aspect, the reference information includes body movement information of the user and/or point of regard information of the user.

With reference to the first aspect and the foregoing implementations, in some implementations of the first aspect, the first instruction carries a name of the second electronic device.

Based on the foregoing technical solution, the first electronic device determines, based on the first instruction that carries the name of the second electronic device, that the second electronic device executes the first task, and sends the second instruction to the second electronic device, so that the second electronic device is an electronic device that is specified by the user to execute the first task, thereby improving user experience.

With reference to the first aspect and the foregoing implementations, in some implementations of the first aspect, the method further includes: obtaining current location information of the first electronic device; and sending a first broadcast message to the second electronic device, where the first broadcast message carries the current location information of the first electronic device.

Based on the foregoing technical solution, the first electronic device sends the first broadcast message, so that other electronic devices including the second electronic device may obtain the current location information of the first electronic device. Further, the second electronic device may control, based on the current location information of the first electronic device and current location information of the second electronic device, a voice assistant of the second electronic device to enter the silent mode.

With reference to the first aspect and the foregoing implementations, in some implementations of the first aspect, the current location information includes a name of an area in which the first electronic device is currently located or coordinates corresponding to a current location of the first electronic device.

With reference to the first aspect and the foregoing implementations, in some implementations of the first aspect, when the current location information includes the coordinates corresponding to the current location of the first electronic device, the first broadcast message further carries information about a communication range corresponding to the first electronic device.

With reference to the first aspect and the foregoing implementations, in some implementations of the first aspect, the obtaining current location information of the first electronic device includes: obtaining map information, where the map information includes map information of the first area; and obtaining the current location information of the first electronic device based on the map information.

With reference to the first aspect and the foregoing implementations, in some implementations of the first aspect, the method further includes: sending a second broadcast message to the second electronic device, where the second broadcast message carries the map information.

With reference to the first aspect and the foregoing implementations, in some implementations of the first aspect, the first electronic device is movable. The method further includes: after the first electronic device is moved to a second area, obtaining, based on the map information, location information of the first electronic device after the movement, where the map information includes map information of the second area; and sending a third broadcast message, where the third broadcast message carries location information of the first electronic device after the movement.

Based on the foregoing technical solution, the first electronic device sends the third broadcast message, so that other electronic devices including the second electronic device may obtain the location information of the first electronic device after the movement. Further, the second electronic device may control, based on the current location information of the first electronic device and the current location information of the second electronic device, the voice assistant of the second electronic device to enter the working mode from the silent mode, so that when the other electronic devices including the second electronic device subsequently receive an instruction triggered by a voice of the user, the other electronic devices including the second electronic device may respond to the instruction triggered by the voice of the user.

With reference to the first aspect and the foregoing implementations, in some implementations of the first aspect, the location information after the movement includes a name of an area in which the first electronic device is located after the movement or coordinates corresponding to a location after the movement of the first electronic device.

According to a second aspect, a voice interaction method is provided. The method is performed by a second electronic device in at least two electronic devices, the at least two electronic devices are located in a first area, voice assistants equipped on the at least two electronic devices are the same, voice assistants of other electronic devices different from a first electronic device in the at least two electronic devices are in a silent mode, and the method includes: obtaining a second instruction from the first electronic device, where the second instruction requests the second electronic device to execute a first task, the second instruction is sent by the first electronic device according to a first instruction, and the first instruction requests to execute the first task; and executing the first task according to the second instruction.

Based on the foregoing technical solution, for a plurality of electronic devices equipped with a same voice assistant, a voice assistant of only one electronic device is in a working mode, and voice assistants of other electronic devices are all in a silent mode. The working mode means that a voice assistant of an electronic device can receive an instruction triggered by a voice of a user, and respond to the instruction. The silent mode means that a voice assistant of an electronic device can receive an instruction, but does not respond to the instruction. When a user gives a voice for the voice assistant, the other electronic devices whose voice assistants are in the silent mode do not respond to a first instruction triggered by the voice of the user, only the electronic device whose voice assistant is in the working mode sends, according to the first instruction triggered by the voice of the user, a second instruction to an electronic device that is in the plurality of electronic devices and that has a capability of executing a task requested by the user, and the electronic device that receives the second instruction executes the task requested by the user. Therefore, according to the method, the plurality of electronic devices in a smart home can be prevented from simultaneously responding to the instruction triggered by the voice of the user, and an electronic device that finally responds is enabled to have the capability of executing the task requested by the user, thereby improving user experience.

With reference to the second aspect, in some implementations of the second aspect, the method further includes: obtaining current location information of the first electronic device and current location information of the second electronic device; and controlling, based on the current location information of the first electronic device and the current location information of the second electronic device, a voice assistant of the second electronic device to enter a silent mode.

Based on the foregoing technical solution, the second electronic device obtains the current location information of the first electronic device and the current location information of the second electronic device, so that the second electronic device controls, based on the current location information of the first electronic device and the current location information of the second electronic device, the voice assistant of the second electronic device to enter the silent mode.

With reference to the second aspect and the foregoing implementations, in some implementations of the second aspect, the current location information of the first electronic device includes a name of an area in which the first electronic device is currently located, the current location information of the second electronic device includes a name of an area in which the second electronic device is currently located, and the controlling, based on the current location information of the first electronic device and the current location information of the second electronic device, a voice assistant of the second electronic device to enter a silent mode includes: if the second electronic device is located in the first area, controlling the voice assistant of the second electronic device to enter the silent mode.

Based on the foregoing technical solution, when the second electronic device determines that the second electronic device is located in the same area as the first electronic device, the voice assistant of the second electronic device enters the silent mode, so that when the user gives a voice for the voice assistant, the other electronic devices that include the second electronic device and whose voice assistants are in the silent mode do not respond to the first instruction triggered by the voice of the user, only the first electronic device whose voice assistant is in the working mode sends, according to the first instruction triggered by the voice of the user, a second instruction to an electronic device that is in the plurality of electronic devices and that has a capability of executing a task requested by the user, and the electronic device that receives the second instruction executes the task requested by the user. Therefore, according to the method, the plurality of electronic devices in a smart home can be prevented from simultaneously responding to the instruction triggered by the voice of the user, and an electronic device that finally responds is enabled to have the capability of executing the task requested by the user, thereby improving user experience.

With reference to the second aspect and the foregoing implementations, in some implementations of the second aspect, the method further includes: obtaining current location information of the first electronic device, current location information of the second electronic device, and information about a communication range corresponding to the first electronic device; and controlling, based on the current location information of the first electronic device, the current location information of the second electronic device, and the information about the communication range corresponding to the first electronic device, the voice assistant of the second electronic device to enter the silent mode.

Based on the foregoing technical solution, the second electronic device obtains the current location information of the first electronic device, the current location information of the second electronic device, and the information about the communication range corresponding to the first electronic device, so that the second electronic device controls, based on the current location information of the first electronic device, the current location information of the second electronic device, and the information about the communication range corresponding to the first electronic device, the voice assistant of the second electronic device to enter the silent mode.

With reference to the second aspect and the foregoing implementations, in some implementations of the second aspect, the current location information of the first electronic device includes coordinates corresponding to a current location of the first electronic device, the current location information of the second electronic device includes coordinates corresponding to a current location of the second electronic device, and the controlling, based on the current location information of the first electronic device, the current location information of the second electronic device, and the information about the communication range corresponding to the first electronic device, the voice assistant of the second electronic device to enter the silent mode includes: determining a distance between the first electronic device and the second electronic device based on the coordinates corresponding to the current location of the first electronic device and the coordinates corresponding to the current location of the second electronic device; determining, based on the distance and range information of the area in which the first electronic device is currently located, whether the second electronic device is located within the communication range corresponding to the first electronic device; and if the second electronic device is located in an area in which the first electronic device can receive the voice of the user, controlling the voice assistant of the second electronic device to enter the silent mode.

Based on the foregoing technical solution, when the second electronic device determines that the second electronic device is located in the area in which the first electronic device can receive the voice of the user, the voice assistant of the second electronic device enters the silent mode, so that when the user gives a voice for the voice assistant, the other electronic devices that include the second electronic device and whose voice assistants are in the silent mode do not respond to the first instruction triggered by the voice of the user, only the first electronic device whose voice assistant is in the working mode sends, according to the first instruction triggered by the voice of the user, a second instruction to an electronic device that is in the plurality of electronic devices and that has a capability of executing a task requested by the user, and the electronic device that receives the second instruction executes the task requested by the user. Therefore, according to the method, the plurality of electronic devices in a smart home can be prevented from simultaneously responding to the instruction triggered by the voice of the user, and an electronic device that finally responds is enabled to have the capability of executing the task requested by the user, thereby improving user experience.

With reference to the second aspect and the foregoing implementations, in some implementations of the second aspect, the obtaining range information of the area in which the first electronic device is currently located includes: receiving the first broadcast message from the first electronic device, where the first broadcast message carries the range information of the area in which the first electronic device is currently located; and obtaining, based on the first broadcast message, the range information of the area in which the first electronic device is currently located.

With reference to the second aspect and the foregoing implementations, in some implementations of the second aspect, the obtaining current location information of the first electronic device includes: receiving the first broadcast message from the first electronic device, where the first broadcast message carries the current location information of the first electronic device; and obtaining the current location information of the first electronic device based on the first broadcast message.

Based on the foregoing technical solution, the first electronic device sends the first broadcast message, so that other electronic devices including the second electronic device may obtain the current location information of the first electronic device. Further, the second electronic device may control, based on the current location information of the first electronic device and current location information of the second electronic device, a voice assistant of the second electronic device to enter the silent mode.

With reference to the second aspect and the foregoing implementations, in some implementations of the second aspect, the obtaining current location information of the second electronic device includes: obtaining map information, where the map information includes map information of the first area; and obtaining the current location information of the second electronic device based on the map information.

With reference to the second aspect and the foregoing implementations, in some implementations of the second aspect, the obtaining the map information includes: receiving a second broadcast message from the first electronic device, where the second broadcast message carries the map information.

With reference to the second aspect and the foregoing implementations, in some implementations of the second aspect, the method further includes: after the first electronic device is moved to a second area, obtaining location information of the first electronic device after the movement; and controlling, based on the location information of the first electronic device after the movement and the current location information of the second electronic device, the voice assistant of the second electronic device to enter a working mode from the silent mode.

Based on the foregoing technical solution, the second electronic device obtains the location information of the first electronic device after the movement and the current location information of the second electronic device, so that after the first electronic device is moved to the second area, the second electronic device determines, based on the location information of the first electronic device after the movement and the current location information of the second electronic device, that the second electronic device and the first electronic device are located in different areas, and controls the voice assistant of the second electronic device to enter the working mode from the silent mode. In this way, when the second electronic device subsequently receives an instruction triggered by a voice of the user, the second electronic device may respond to the instruction triggered by the voice of the user.

With reference to the second aspect and the foregoing implementations, in some implementations of the second aspect, the location information of the first electronic device after the movement includes a name of an area in which the first electronic device is located after the movement, the current location information of the second electronic device includes the name of the area in which the second electronic device is currently located, and the controlling, based on the location information of the first electronic device after the movement and the current location information of the second electronic device, the voice assistant of the second electronic device to enter a working mode from the silent mode includes: if the first electronic device is located in the second area, and the second electronic device is located in the first area, controlling the voice assistant of the second electronic device to enter the working mode from the silent mode.

With reference to the second aspect and the foregoing implementations, in some implementations of the second aspect, the method further includes: after the first electronic device is moved to a second area, obtaining location information of the first electronic device after the movement; and controlling, based on the location information of the first electronic device after the movement, the current location information of the second electronic device, and the information about the communication range corresponding to the first electronic device, the voice assistant of the second electronic device to enter the working mode from the silent mode.

Based on the foregoing technical solution, the second electronic device obtains the location information of the first electronic device after the movement, so that after the first electronic device is moved to the second area, the second electronic device determines, based on the location information of the first electronic device after the movement, the current location information of the second electronic device, and the information about the communication range corresponding to the first electronic device, that the second electronic device is located outside the communication range corresponding to the first electronic device, and controls the voice assistant of the second electronic device to enter the working mode from the silent mode. In this way, when the second electronic device subsequently receives an instruction triggered by a voice of the user, the second electronic device may respond to the instruction triggered by the voice of the user.

With reference to the second aspect and the foregoing implementations, in some implementations of the second aspect, the location information of the first electronic device after the movement includes coordinates corresponding to a location after the movement of the first electronic device, the current location information of the second electronic device includes the coordinates corresponding to the current location of the second electronic device, and the controlling, based on the location information of the first electronic device after the movement, the current location information of the second electronic device, and the information about the communication range corresponding to the first electronic device, the voice assistant of the second electronic device to enter the working mode from the silent mode includes: determining the distance between the first electronic device and the second electronic device based on the coordinates corresponding to the location after the movement of the first electronic device and the coordinates corresponding to the current location of the second electronic device; determining, based on the distance and the information about the communication range corresponding to the first electronic device, whether the second electronic device is located within the communication range corresponding to the first electronic device; and if the second electronic device is located outside the communication range corresponding to the first electronic device, controlling the voice assistant of the second electronic device to enter the working mode from the silent mode.

With reference to the second aspect and the foregoing implementations, in some implementations of the second aspect, the obtaining location information of the first electronic device after the movement includes: when a third broadcast message is received, obtaining the location information of the first electronic device after the movement based on the third broadcast message, where the third broadcast message carries the location information of the first electronic device after the movement, and the map information includes map information of the second area.

With reference to the second aspect and the foregoing implementations, in some implementations of the second aspect, the second instruction is sent by the first electronic device according to the first instruction and reference information, and the reference information indicates that a user expects the second electronic device to execute the first task.

Based on the foregoing technical solution, the first electronic device may determine, based on the reference information and the first instruction, that the second electronic device executes the first task, and send the second instruction to the second electronic device, so that the second electronic device is an electronic device that the user expects to execute the first task, thereby improving user experience.

With reference to the second aspect and the foregoing implementations, in some implementations of the second aspect, the reference information includes body movement information of the user and/or point of regard information of the user.

With reference to the second aspect and the foregoing implementations, in some implementations of the second aspect, the first instruction carries a name of the second electronic device.

Based on the foregoing technical solution, the first electronic device determines, based on the first instruction that carries the name of the second electronic device, that the second electronic device executes the first task, and sends the second instruction to the second electronic device, so that the second electronic device is an electronic device that is specified by the user to execute the first task, thereby improving user experience.

According to a third aspect, this application provides an apparatus. The apparatus is included in electronic devices, and the apparatus has a function of implementing behavior of the electronic devices in the foregoing aspects and the possible implementations of the foregoing aspects. The function may be implemented by hardware, or may be implemented by executing corresponding software by hardware.

Optionally, the apparatus may be the foregoing first electronic device or the foregoing second electronic device.

According to a fourth aspect, this application provides an electronic device, including one or more processors, a memory, a plurality of application programs, and one or more computer programs. The one or more computer programs are stored in the memory. The one or more computer programs include instructions. When the instructions are executed by the electronic device, the electronic device is enabled to perform the voice interaction method according to any possible implementation of any one of the foregoing aspects.

Optionally, the electronic device may be the foregoing first electronic device or the foregoing second electronic device.

According to a fifth aspect, this application provides an electronic device, including one or more processors and one or more memories. The one or more memories are coupled to the one or more processors. The one or more memories are configured to store computer program code. The computer program code includes computer instructions. When the one or more processors execute the computer instructions, the electronic device is enabled to perform the voice interaction method according to any possible implementation of any one of the foregoing aspects.

According to a sixth aspect, a communications system is provided. The communications system includes at least a first electronic device and a second electronic device, the first electronic device is configured to perform the voice interaction method according to any possible implementation of the first aspect, and the second electronic device is configured to perform the voice interaction method according to any possible implementation of the second aspect.

According to a seventh aspect, this application provides a computer-readable storage medium, including computer instructions. When the computer instructions are run on an electronic device, the electronic device is enabled to perform the voice interaction method according to any possible implementation of any one of the foregoing aspects.

According to an eighth aspect, this application provides a computer program product. When the computer program product is run on an electronic device, the electronic device is enabled to perform the voice interaction method according to any possible implementation of any one of the foregoing aspects.

Figure 3:
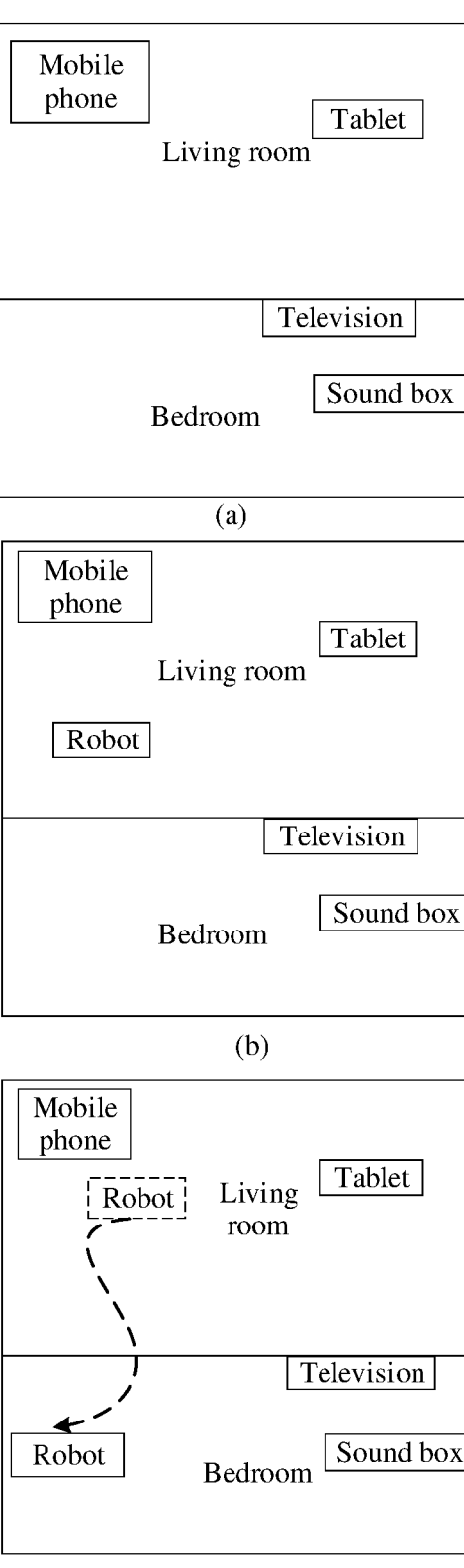
Figure 4:
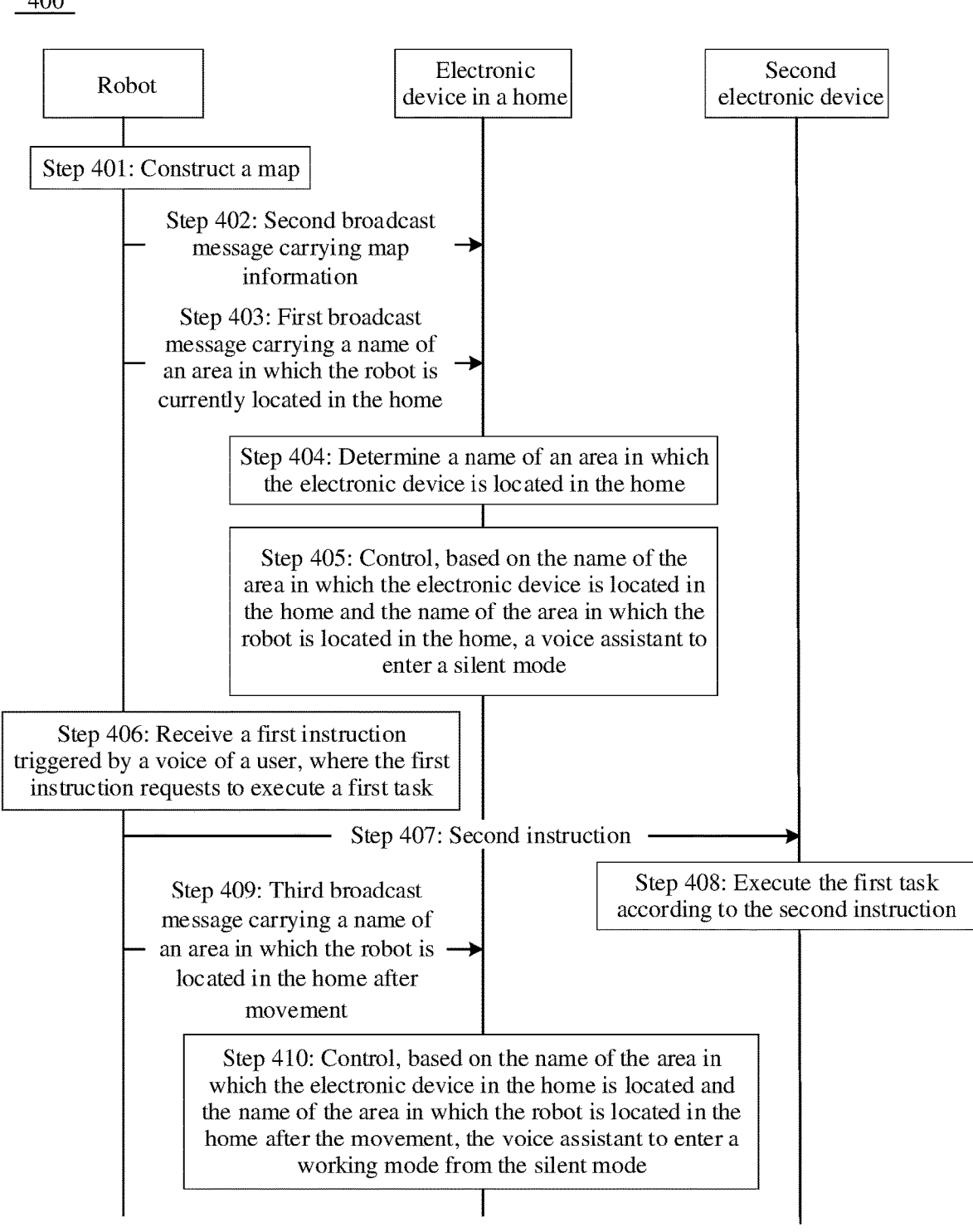
Figure 5A:
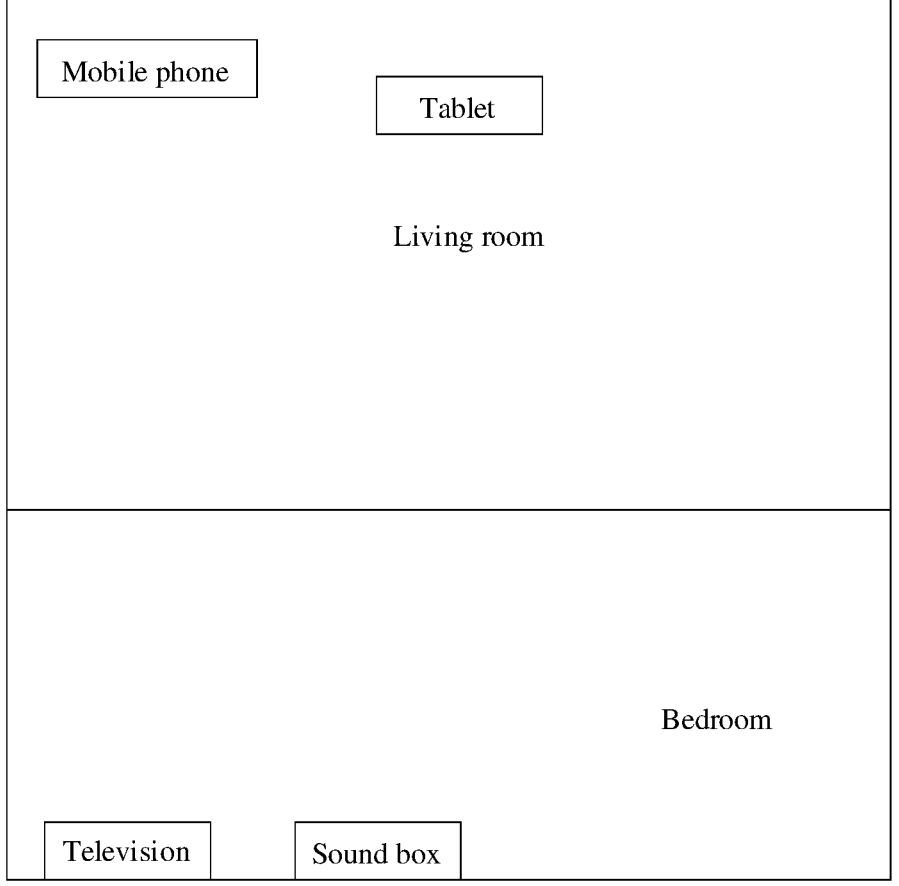
Figure 5B:
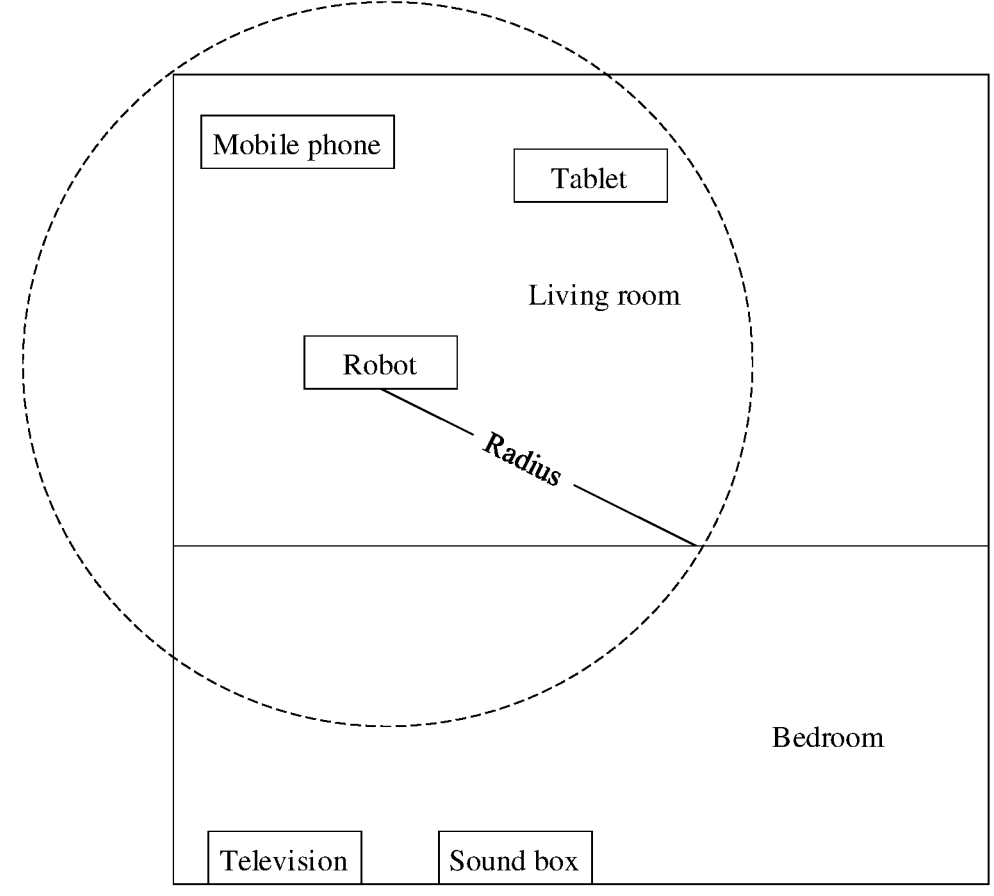
Figure 5C:
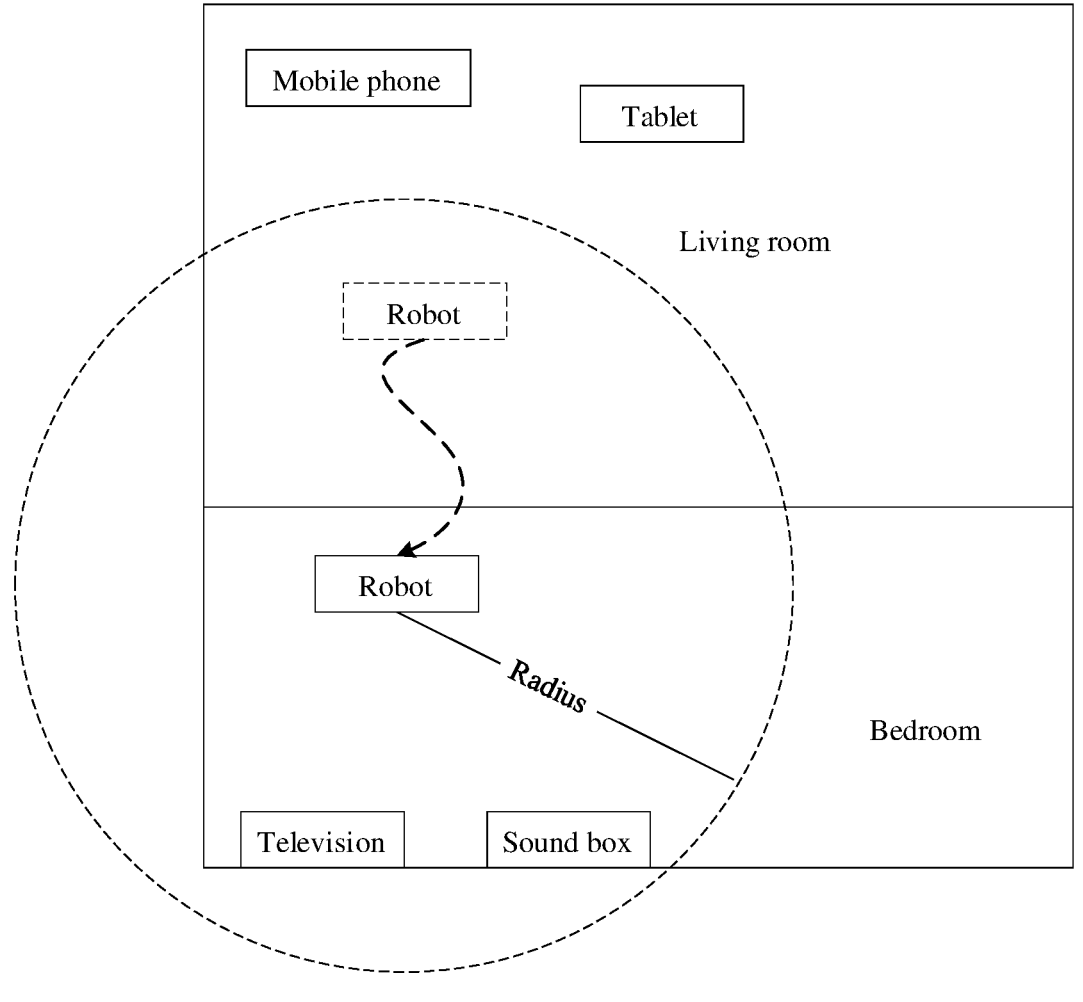
Figure 6:
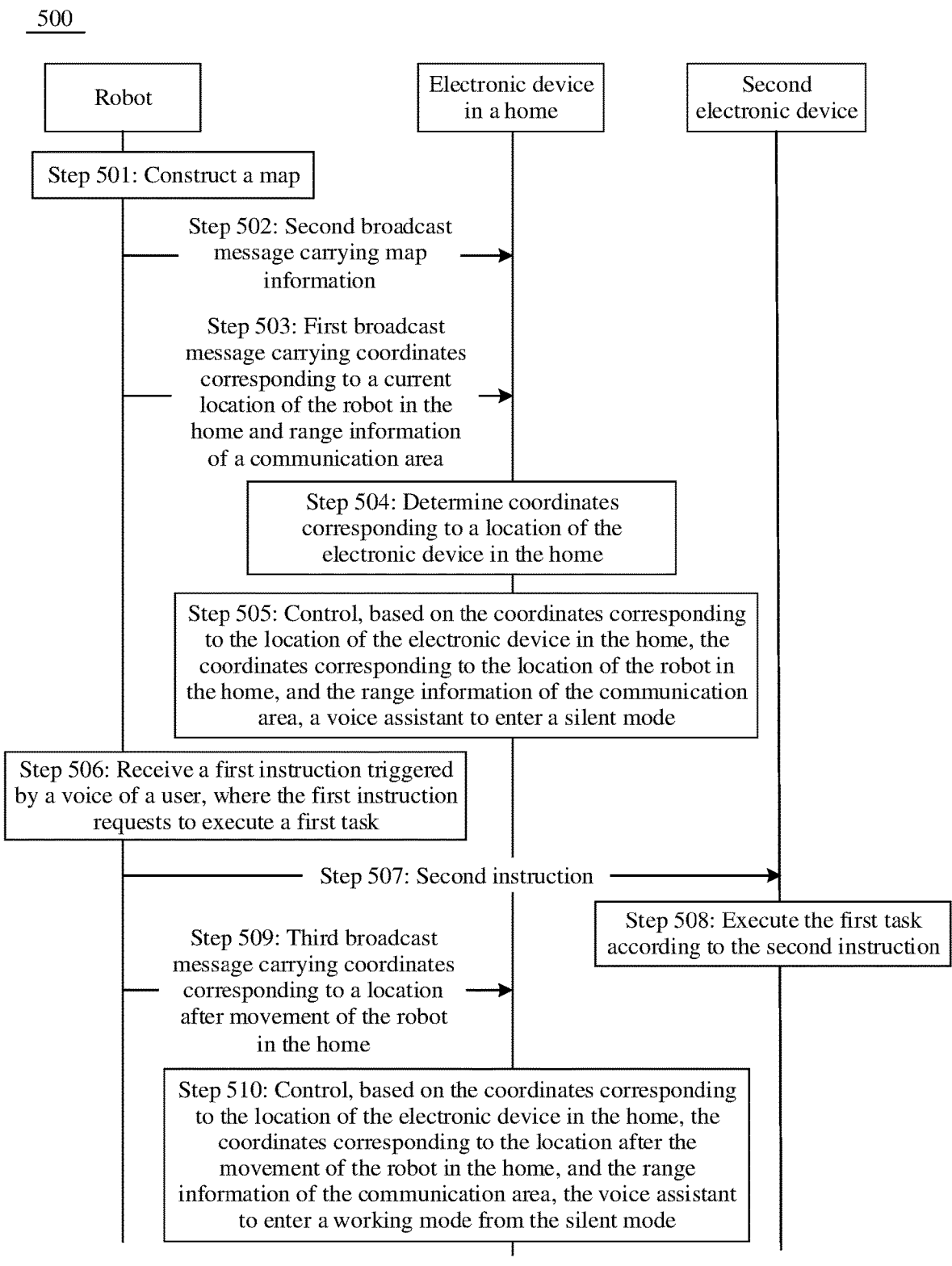

(a) in FIG. 3 is a schematic diagram of an example of a home environment according to an embodiment of this application;

(b) in FIG. 3 is a schematic diagram of another example of a home environment according to an embodiment of this application;

(c) in FIG. 3 is a schematic diagram of still another example of a home environment according to an embodiment of this application;

FIG. 4 is a schematic flowchart of a voice interaction method according to an embodiment of this application;

FIG. 5(a) is a schematic diagram of still another example of a home environment according to an embodiment of this application;

FIG. 5(b) is a schematic diagram of still another example of a home environment according to an embodiment of this application;

FIG. 5(c) is a schematic diagram of a still another example of a home environment according to an embodiment of this application; and FIG. 6 is a schematic flowchart of another example of a voice interaction method according to an embodiment of this application.

DETAILED DESCRIPTION OF ILLUSTRATIVE EMBODIMENTS

The following describes the technical solutions in embodiments of this application with reference to the accompanying drawings in embodiments of this application.

Figure 1:
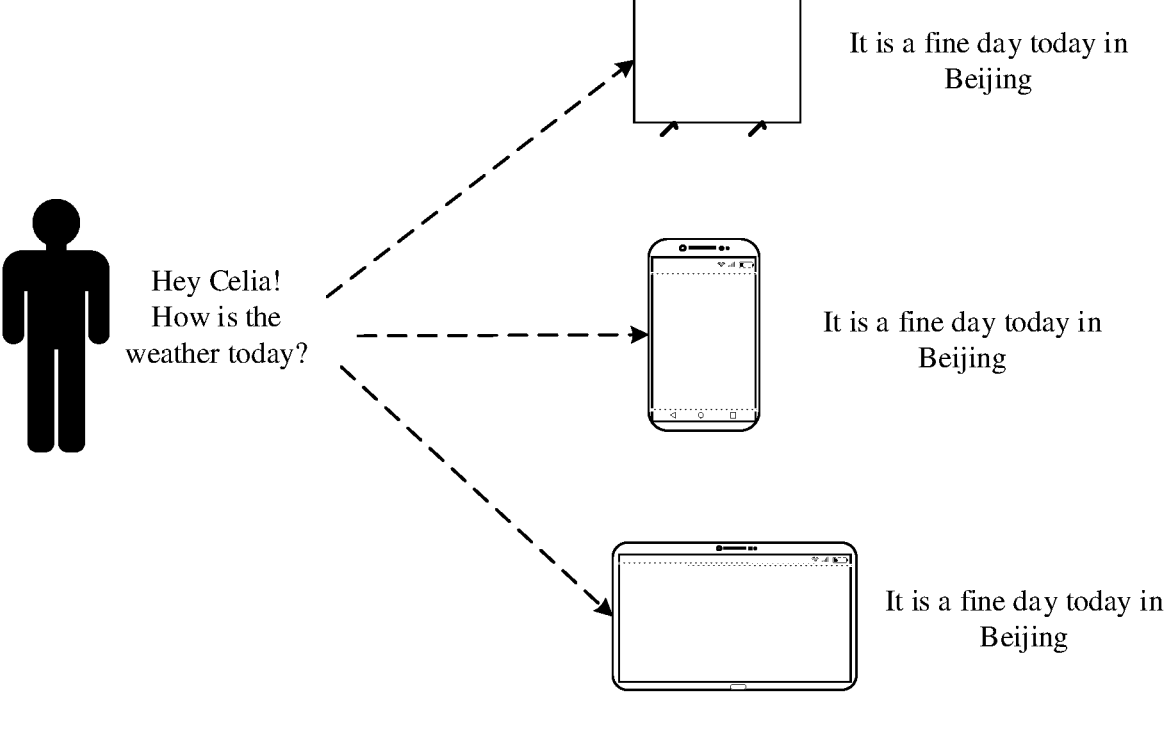
FIG. 1 is a schematic diagram of a scenario in which a user performs voice interaction with a voice assistant of an electronic device according to an embodiment of this application.

When there are a plurality of intelligent electronic devices equipped with a same voice assistant around a user, FIG. 1 is a schematic diagram of a scenario in which each intelligent electronic device responds to, when the user gives a voice for a voice assistant, an instruction triggered by the voice of the user. Herein, it is assumed that when the user gives the voice for the voice assistant, all the intelligent electronic devices around the user can receive an instruction from the user. For brevity, the "intelligent electronic device" is referred to as "electronic device" for short in the following.

For example, a smart television, a smartphone, and a smart tablet that are equipped with a same voice assistant exist around the user. After the user gives a voice "Hey Celia", the television, the mobile phone, and the tablet are all woken up by the user. Then, the user gives a voice "How is the weather today" In this case, the smart television, the smartphone, and the smart tablet all respond to the user. For example, the television, the mobile phone, and the tablet simultaneously give a voice "It is a fine day today in Beijing". Because there are a plurality of voices at the same time, this affects hearing experience of the user.

In view of the foregoing problem, the following solution is proposed: When voice assistants on a plurality of electronic devices receive an instruction triggered by a voice of a user, the plurality of electronic devices negotiate with each other, and finally an electronic device determined through negotiation responds to the user, and other electronic devices do not respond to the user.

However, the electronic device determined through negotiation may not have a capability of executing a task requested by the user. For example, the user wants to play a movie by using a smart television, but a smart refrigerator finally responds to the user. However, the smart refrigerator does not have a capability of playing a movie. Consequently, the method affects user experience.

In view of this, this application proposes a voice interaction method. For a plurality of electronic devices equipped with a same voice assistant, a voice assistant of only one electronic device is in a working mode, and voice assistants of other electronic devices are all in a silent mode. The working mode means that a voice assistant of an electronic device can receive an instruction triggered by a voice of a user, and respond to the instruction. The silent mode means that a voice assistant of an electronic device can receive an instruction, but does not respond to the instruction. When a user gives a voice for the voice assistant, the other electronic devices whose voice assistants are in the silent mode do not respond to a first instruction triggered by the voice of the user, only the electronic device whose voice assistant is in the working mode sends, according to the first instruction triggered by the voice of the user, a second instruction to an electronic device that is in the plurality of electronic devices and that has a capability of executing a task requested by the user, and the electronic device that receives the second instruction executes the task requested by the user. Therefore, according to the method, the plurality of electronic devices can be prevented from simultaneously responding to the instruction triggered by the voice of the user, and an electronic device that finally responds is enabled to have the capability of executing the task requested by the user, thereby improving user experience.

The voice interaction method provided in embodiments of this application may be applied to an electronic device such as an AR/VR device, a mobile phone, a tablet computer, a robot, a wearable device, an in-vehicle device, a notebook computer, an ultra-mobile personal computer (ultra-mobile personal computer, UMPC), a netbook, or a personal digital assistant (personal digital assistant, PDA). A specific type of the electronic device is not limited in embodiments of this application.

The robot may be one of robots that have an autonomous mobility capability, such as a robot vacuum, a robot mop, a robot vacuum and mop combo, an air purification robot, a butler robot, a domestic robot, an entertainment robot, an educational robot, a child care robot, an elder care robot, and a home care robot.

Figure 2:
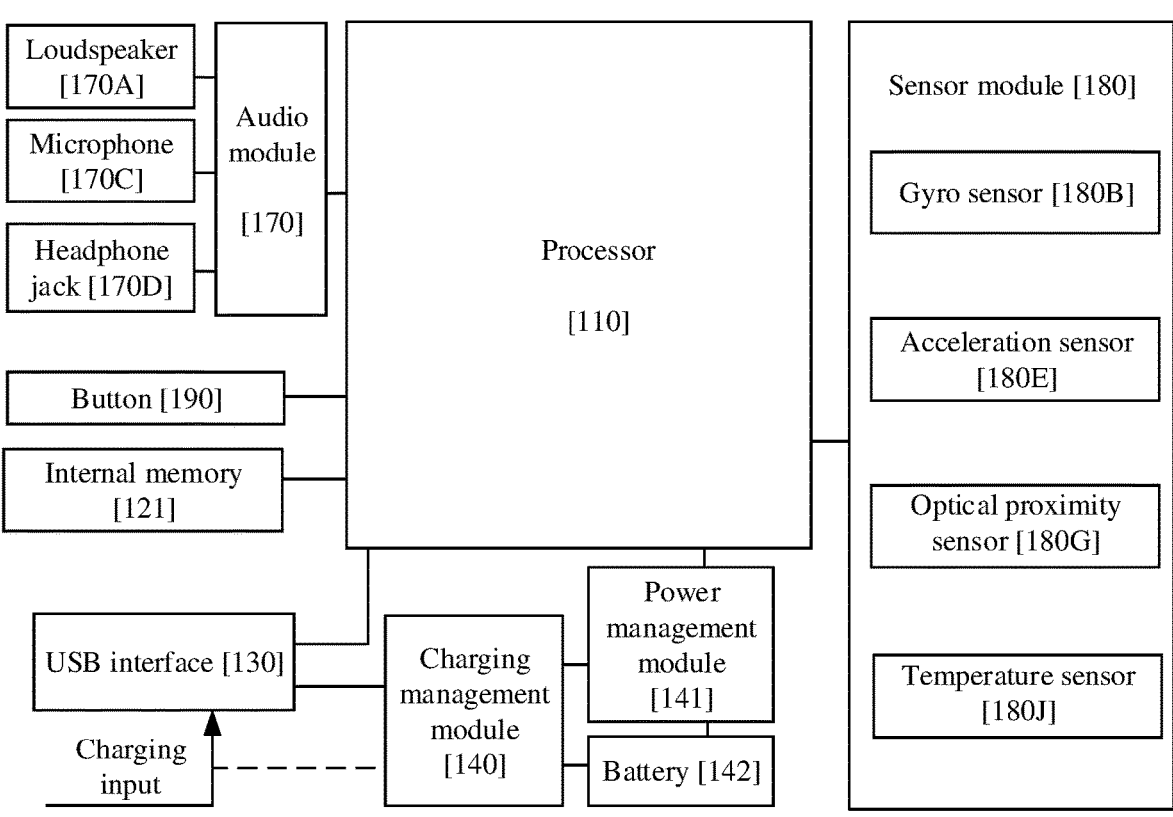
FIG. 2 is a schematic diagram of a structure of an example of an electronic device according to an embodiment of this application.

For example, FIG. 2 is a schematic diagram of a structure of an example of an electronic device 100 according to an embodiment of this application. In specific implementation, the electronic device 100 may be a first electronic device or a second electronic device in embodiments of this application. The electronic device 100 may include a processor 110, an internal memory 121, a universal serial bus (universal serial bus, USB) interface 130, a charging management module 140, a power management module 141, a battery 142, an audio module 170, a loudspeaker 170A, a microphone 170C, a headphone jack 170D, a sensor module 180, a button 190, a display 194, and the like. The sensor module 180 may include a gyro sensor 180B, an acceleration sensor 180E, an optical proximity sensor 180G, a temperature sensor 180J, and the like.

It may be understood that the structure shown in this embodiment of the present invention does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store an instruction or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a universal serial bus (universal serial bus, USB) interface, and/or the like.

The MIPI interface may be configured to connect the processor 110 to a peripheral component such as the display 194. The MIPI interface includes a camera serial interface (camera serial interface, CSI), a display serial interface (display serial interface, DSI), and the like. In some embodiments, the processor 110 communicates with the display 194 through the DSI interface, to implement a display function of the electronic device 100.

The GPIO interface may be configured by software. The GPIO interface may be configured as a control signal or a data signal. In some embodiments, the GPIO interface may be configured to connect the processor 110 to the display 194, the audio module 170, the sensor module 180, and the like. The GPIO interface may alternatively be configured as an I2C interface, an I2S interface, a UART interface, an MIPI interface, or the like.

The USB interface 130 is an interface that conforms to a USB standard specification, and may be specifically a mini USB interface, a micro USB interface, a USB type-C interface, or the like. The USB interface 130 may be configured to connect to a charger to charge the electronic device 100, or may be configured to transmit data between the electronic device 100 and a peripheral device, or may be configured to connect to a headphone for playing audio through the headphone. The interface may be further configured to connect to another electronic device such as an AR device.

It may be understood that an interface connection relationship between the modules that is shown in this embodiment of the present invention is merely an example for description, and does not constitute a limitation on a structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from a charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the electronic device 100. The charging management module 140 supplies power to the electronic device through the power management module 141 while charging the battery 142.

The power management module 141 is configured to connect to the battery 142, the charging management module 140, and the processor 110. The power management module 141 receives input of the battery 142 and/or the charging management module 140, and supplies power to the processor 110, the internal memory 121, and the display 194. The power management module 141 may be configured to monitor parameters such as a battery capacity, a battery cycle count, and a battery state of health (electric leakage or impedance). In some other embodiments, the power management module 141 may alternatively be disposed in the processor 110. In some other embodiments, the power management module 141 and the charging management module 140 may alternatively be disposed in a same device.

The electronic device 100 may implement a display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, a quantum dot light-emitting diode (quantum dot light-emitting diode, QLED), or the like. In some embodiments, the electronic device 100 may include one or N displays 194, where N is a positive integer greater than 1.

When the display 194 displays an image or a video, a DDIC (not shown in FIG. 1) outputs an analog signal corresponding to the image, the video, or the like to a display component inside the display 194, so that the display 194 displays a corresponding picture. For example, the DDIC outputs a controlled voltage or a controlled current to an anode and a cathode of an OLED luminous layer, and the anode and the cathode receive the controlled voltage or the controlled current to complete driving of each pixel, so that the display displays a picture.

The internal memory 121 may be configured to store computer-executable program code. The executable program code includes instructions. The internal memory 121 may include a program storage area and a data storage area.

The program storage area may store an operating system, an application required by at least one function (for example, a voice playing function or an image playing function), and the like. The data storage area may store data (such as audio data) constructed when the electronic device 100 is used. In addition, the internal memory 121 may include a high-speed random access memory, or may include a nonvolatile memory, for example, at least one magnetic disk storage device, a flash memory, or a universal flash storage (universal flash storage, UFS). The processor 110 runs instructions stored in the internal memory 121 and/or instructions stored in the memory disposed in the processor, to perform various function applications and data processing of the electronic device 100.

The electronic device 100 may implement audio functions by using the audio module 170, the loudspeaker 170A, the microphone 170C, the headphone jack 170D, the application processor, and the like, for example, music playing.

The audio module 170 is configured to convert digital audio information into an analog audio signal for output, and is also configured to convert analog audio input into a digital audio signal. The audio module 170 may be further configured to encode and decode an audio signal. In some embodiments, the audio module 170 may be disposed in the processor 110, or some functional modules in the audio module 170 are disposed in the processor 110.

The loudspeaker 170A, also referred to as a "loudspeaker", is configured to convert an audio electrical signal into a sound signal. The electronic device 100 may listen to music by using the loudspeaker 170A.

The microphone 170C, also referred to as a "mike" or a "mic", is configured to convert a sound signal into an electrical signal. The user may speak with the mouth approaching the microphone 170C, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, to implement a directional recording function and the like.

The headphone jack 170D is configured to connect to a wired headphone. The headphone jack 170D may be a USB interface 130, or may be a 3.5 mm open mobile terminal platform (open mobile terminal platform, OMTP) standard interface or cellular telecommunications industry association of the USA (cellular telecommunications industry association of the USA, CTIA) standard interface.

The gyro sensor 180B may be configured to determine a moving posture of the electronic device 100. In some embodiments, an angular velocity of the electronic device 100 around three axes (namely, axes x, y, and z) may be determined through the gyro sensor 180B. The gyro sensor 180B may be used in a navigation scenario and a motion-sensing game scenario.

The acceleration sensor 180E may detect accelerations in various directions (usually on three axes) of the electronic device 100. When the electronic device 100 is still, a magnitude and a direction of gravity may be detected. The acceleration sensor may be further configured to identify a posture of the electronic device, and is applied to an application such as a pedometer.

The optical proximity sensor 180G may include, for example, a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object through the photodiode. When sufficient reflected light is detected, it may be determined that there is an object near the electronic device 100. When insufficient reflected light is detected, the electronic device 100 may determine that there is no object near the electronic device 100.

The temperature sensor 180J is configured to detect a temperature. In some embodiments, the electronic device 100 executes a temperature processing policy through the temperature detected by the temperature sensor 18J. For example, when the temperature reported by the temperature sensor 180J exceeds a threshold, the electronic device 100 lowers performance of a processor nearby the temperature sensor 180J, to reduce power consumption for thermal protection. In some other embodiments, when the temperature is less than another threshold, the electronic device 100 heats the battery 142 to prevent the electronic device 100 from being shut down abnormally due to a low temperature. In some other embodiments, when the temperature is lower than still another threshold, the electronic device 100 boosts an output voltage of the battery 142 to avoid abnormal shutdown caused by a low temperature.

The button 190 includes a power button, a volume button, and the like. The button 190 may be a mechanical button, or may be a touch button. The electronic device 100 may receive a key input, and generate a key signal input related to a user setting and function control of the electronic device 100.

It should be understood that, in addition to the various components or modules listed in FIG. 2, a structure of the electronic device 100 is not specifically limited in this embodiment of this application. In some other embodiments of this application, the electronic device 100 may further include more or fewer components than those shown in the figure, or some components may be combined, or some components may be split, or different component arrangements may be used. The components shown in the figure may be implemented by hardware, software, or a combination of software and hardware.

With reference to the scenario in FIG. 3, the following describes, by using an example in which a first electronic device is a robot, an embodiment of a voice interaction method provided in this application. FIG. 4 is an example interaction flowchart of a voice interaction method 400.

Step 401: The robot constructs a map.

For example, after the robot is started for the first time, a map of an environment in which the robot is located may be constructed. For example, the environment in which the robot is located is a home environment, and there is another electronic device in addition to the robot in a home. In the following description, the electronic device in the home other than the robot is referred to as an electronic device in the home. After the robot is started for the first time, the robot can use a simultaneous localization and mapping (simultaneous localization and mapping, SLAM) technology to construct a map of the home environment.

For example, the robot constructs the map of the home environment by using a LiDAR simultaneous localization and mapping (LiDAR simultaneous localization and mapping, LiDAR SLAM) technology. After the map of the home environment is constructed, the map may be labeled.

In an implementation, manual labeling may be performed on the constructed map. For example, a user may manually enter names of electronic devices and areas on the map, so that electronic devices and areas in a home can be displayed on the manually labeled map. It should be noted that the areas in the home may be areas such as a bedroom, a living room, and a kitchen in the home.

In another implementation, the robot may label the map through image semantic understanding. For example, the robot may obtain a plurality of frames of images about the home environment by using a camera on the robot, identify names of electronic devices and names of areas through image semantic understanding of the obtained plurality of frames of images, and finally label the map, so that names of electronic devices and areas can be displayed on the labeled map. In this application, a manner in which the robot labels the map through image semantic understanding is referred to as an automatic labeling manner.

For example, the home environment is shown in (a) in FIG. 3, and the home includes electronic devices such as a mobile phone, a tablet, a television, and a sound box. The mobile phone and the tablet are placed in the living room, and the television and the sound box are installed in the bedroom. Names of areas and names of electronic devices in the home environment are displayed on the map after manual labeling or automatic labeling. For example, on the map, a word "bedroom" appears in an area corresponding to the bedroom, and a word "living room" appears in an area corresponding to the living room, a word "mobile phone" appears at a location of the mobile phone, and a word "television" appears at a location of the television.

Step 402: The robot sends a second broadcast message, where the second broadcast message carries map information.

After labeling the constructed map, the robot may add the map information to the second broadcast message and send the second broadcast message to an electronic device in the home. After the robot sends the second broadcast message, the electronic devices such as the mobile phone, the tablet, the television, and the sound box may receive the second broadcast message. Based on the second broadcast message, the electronic device such as the mobile phone, the tablet, the television, and the sound box may obtain the map information of the home environment.

In addition, the robot may further upload the map information to a cloud server. It is assumed that an electronic device in the home and the robot share a same cloud account. In this case, the electronic device in the home may synchronize the map information from the cloud server to a local device.

Step 403: The robot sends a first broadcast message, where the first broadcast message carries a name of an area in which the robot is currently located in the home.

In addition to notifying an electronic device in the home of the map information of the home environment, the robot may further periodically determine, by using an indoor positioning technology, the area in which the robot is currently located in the home, and notify the electronic device in the home of the name of the area in which the robot is currently located in the home environment. The indoor positioning technology may include, for example, a Bluetooth-based indoor positioning technology, a wireless-fidelity (wireless-fidelity, Wi-Fi)-based indoor positioning technology, a ZigBee-based indoor positioning technology, and an ultra-wideband (ultra wide band, UWB)-based indoor positioning technology.

For example, the robot determines, on the map of the home environment by using the indoor positioning technology, coordinates corresponding to a location of the robot in the home. Further, the robot may determine, based on the corresponding coordinates on the map of the home environment, the area in which the robot is currently located in the home.

After the area in which the robot is currently located in the home is determined, the robot may send the first broadcast message, where the first broadcast message carries the name of the area in which the robot is currently located in the home.

After the robot sends the first broadcast message, the electronic devices such as the mobile phone, the tablet, the television, and the sound box may receive the first broadcast message. Based on the first broadcast message, the electronic devices such as the mobile phone, the tablet, the television, and the sound box may obtain the name of the area in which the robot is currently located in the home.

In addition, the robot may further upload, to the cloud server, the name of the area in which the robot is currently located in the home. It is assumed that an electronic device in the home and the robot share a same cloud account. In this case, the electronic device in the home may synchronize, from the cloud server to a local device, the name of the area in which the robot is currently located in the home.

Step 404: The electronic device in the home determines a name of an area in which the electronic device is located in the home.

The electronic device in the home may determine, by using an indoor positioning technology, the area in which the electronic device is currently located in the home. For example, the electronic device determines, by using the indoor positioning technology, a location of the electronic device in the home, and determines coordinates corresponding to the location on the map of the home environment. Further, the electronic device may determine, based on the corresponding coordinates on the map of the home environment, the area in which the electronic device is currently located in the home.

Step 405: The electronic device in the home controls, based on the name of the area in which the electronic device is located in the home and the name of the area in which the robot is located in the home, a voice assistant of the electronic device to enter a silent mode.

The electronic device in the home may determine, based on the name of the area in which the electronic device is located in the home and the name of the area in which the robot is currently located in the home, whether the electronic device is located in the same area as the robot, and if the electronic device determines that the electronic device is located in the same area as the robot, the electronic device may control the voice assistant of the electronic device to enter the silent mode. The robot and the electronic device in the home are equipped with a same voice assistant. For example, the robot and the electronic device in the home are equipped with a voice assistant of a same manufacturer. Therefore, when the voice assistant of the electronic device, in the home, that is located in the same area as the robot is in the silent mode, if the user gives a "voice for a voice assistant" in the area in which the robot is located, the electronic device in the home in the area in which the robot is located does not respond to the instruction. It should be noted that, in this embodiment of this application, when the user gives a "voice for a voice assistant" in the area in which the robot is located, an electronic device, in the home, that is located in the same area as the robot and a voice assistant of the robot may receive an instruction triggered by the voice of the user. In addition, a voice assistant of an electronic device in the home and located outside the area may also receive the instruction triggered by the voice of the user. This is not limited in this application.

For example, as shown in (b) in FIG. 3, the robot is currently located in the living room, the mobile phone and the tablet are currently located in the living room, and the television and the sound box are currently located in the bedroom. Therefore, the mobile phone and the tablet determine, based on a name of an area in which the mobile phone and the robot are located in the home and a name of an area in which the robot is located in the home, that the mobile phone and the tablet are located in the same area as the robot. Herein, the living room is corresponding to a first area.

For the mobile phone and the tablet, because the mobile phone and the tablet are located in the same area as the robot, in this case, the mobile phone and the tablet may control respective voice assistants of the mobile phone and the tablet to enter the silent mode.

Step 406: The robot receives a first instruction triggered by the voice of the user, where the first instruction requests to execute a first task.

Step 407: The robot sends, according to the first instruction triggered by the voice of the user, a second instruction to a second electronic device in the electronic devices in the home, where the second instruction requests the second electronic device to execute the first task. Correspondingly, the second electronic device receives the second instruction from the robot.

Step 408: The second electronic device executes the first task according to the second instruction.

In step 407, it is assumed that the user gives a "voice for a voice assistant" in the living room. After obtaining the first instruction triggered by the voice of the user, the voice assistant of the robot determines, based on the first instruction, that the second electronic device in the living room executes the first task, and sends the second instruction to the second electronic device. The following separately describes several manners in which the voice assistant of the robot determines the second electronic device that executes the first task.

Manner 1: The voice assistant of the robot determines, based on the first instruction, the second electronic device that executes the first task.

For example, the user gives a voice "Please play a song 1" in the living room. In this case, the voice assistant of the robot may determine, based on the first instruction triggered by the voice of the user, that the first task needs to be executed by an electronic device having an audio playing capability. Further, the voice assistant of the robot may determine whether an electronic device having an audio playing capability exists in the current living room.

For example, the voice assistant of the robot may view the electronic device in the living room on the constructed map of the home environment. It can be learned from (b) in FIG. 3 that currently, there are a mobile phone and a tablet in the living room. Therefore, the voice assistant of the robot may determine, by using the map of the home environment, that there are electronic devices having an audio playing capability in the living room, and the electronic devices are respectively the mobile phone and the tablet. The voice assistant of the robot may select one from the mobile phone and the tablet as an electronic device for playing a song.

For example, the voice assistant of the robot considers that sound quality of the mobile phone is better, and determines that the mobile phone executes the first task, that is, the mobile phone plays the song 1. In this case, the second electronic device is the mobile phone.

In addition, the voice assistant of the robot may alternatively select any electronic device from the mobile phone and the tablet as the second electronic device for executing the first task. This is not limited in this application. For example, the voice assistant of the robot determines that the tablet executes the first task. In this case, the second electronic device is the tablet.

It should be noted that, if the voice assistant of the robot does not find, on the map, an electronic device having an audio playing capability, the voice assistant of the robot may prompt the user that currently, there is no electronic device having an audio playing capability in the living room, and then the voice assistant of the robot may perform a corresponding operation according to a further instruction of the user.

Manner 2: The voice assistant of the robot determines, based on a name of the second electronic device carried in the first instruction, the second electronic device that executes the first task.

For example, the user gives a voice "Please play an animation 1 on the tablet" in the living room. In this case, the voice assistant of the robot may determine, based on the first instruction triggered by the voice of the user, that the first task needs to be executed by the tablet. Further, the voice assistant of the robot may determine whether the tablet exists in the current living room.

For example, the voice assistant of the robot may view the electronic device in the living room on the constructed map of the home environment. It can be learned from (b) in FIG. 3 that the tablet is placed in the living room. Therefore, the voice assistant of the robot may determine, by using the map of the home environment, that the tablet is placed in the living room. In this case, the voice assistant of the robot may use the tablet as an electronic device for playing the animation 1. In this case, the second electronic device is the tablet.

It should be noted that, if the voice assistant of the robot does not find the tablet on the map, the voice assistant of the robot may prompt the user that currently the tablet does not exist in the living room, and then the voice assistant of the robot may perform a corresponding operation according to a further instruction of the user.

Manner 3: The voice assistant of the robot determines, based on a reference message and the first instruction, the second electronic device that executes the first task.

For example, the user gives a voice "How to get to the World Horticultural Exposition garden" in the living room. After receiving the first instruction, the voice assistant of the robot may determine, based on the first instruction triggered by the voice of the user, that the first task needs to be executed by an electronic device having a display function. Further, the voice assistant of the robot may determine whether an electronic device having a display function exists in the current living room.

For example, the voice assistant of the robot may view the electronic device in the living room on the constructed map of the home environment. It can be learned from (b) in FIG. 3 that the mobile phone and the tablet are placed in the living room. Therefore, the voice assistant of the robot may determine, by using the map of the home environment, that there are electronic devices having a display function in the living room, and the electronic devices are respectively the mobile phone and the tablet. The voice assistant of the robot may select one from the mobile phone and the tablet as the second electronic device for executing the first task.

When determining the second electronic device that executes the first task, the voice assistant of the robot may obtain reference information, and determine, based on the reference information, the second electronic device that executes the first task, where the reference information may include body movement information of the user and/or point of regard information of the user.

For example, in an implementation, the voice assistant of the robot obtains at least one frame of image about the home environment by using a camera. After analyzing the obtained image, it is assumed that the voice assistant of the robot determines that a finger of the user is currently in a state of pointing to the mobile phone. In this case, the reference information obtained by the voice assistant of the robot is body movement information of the user. Based on the body movement information of the user, the voice assistant of the robot may determine that the mobile phone executes the first task, to be specific, the mobile phone displays a corresponding route to the user. In this case, the second electronic device is the mobile phone.

In another implementation, the voice assistant of the robot obtains at least one frame of image about the home environment by using a camera. After analyzing the obtained image, it is assumed that the voice assistant of the robot determines that a point of regard of the user currently falls on the tablet. In this case, the reference information obtained by the voice assistant of the robot is point of regard information of the user. Based on the point of regard information of the user, the voice assistant of the robot may determine that the tablet executes the first task, to be specific, the tablet displays a corresponding route to the user. In this case, the second electronic device is the tablet.

In still another implementation, the voice assistant of the robot obtains at least one frame of image about the home environment by using a camera. After analyzing the obtained image, it is assumed that the voice assistant of the robot determines that a point of regard of the user currently falls on the tablet and determines that a finger of the user is currently in a state of pointing to the tablet. In this case, the reference information obtained by the voice assistant of the robot is point of regard information of the user and body movement information of the user. Based on the point of regard information of the user and the body movement information of the user, the voice assistant of the robot may determine that the tablet executes the first task, to be specific, the tablet displays a corresponding route to the user. In this case, the second electronic device is the tablet.

It should be noted that, if the voice assistant of the robot does not find, on the map, an electronic device having a display function, the voice assistant of the robot may prompt the user that currently there is no electronic device having a display function in the living room, and then the voice assistant of the robot may perform a corresponding operation according to a further instruction of the user.

In step S407, after the second electronic device that executes the first task is determined, the voice assistant of the robot may send the second instruction to a voice assistant of the second electronic device. For example, the voice assistant of the robot may send the second instruction to the voice assistant of the second electronic device in the following manner:

The voice assistant of the robot may add the second instruction to a fourth broadcast message, and send the fourth broadcast message, where the fourth broadcast message carries an identifier of the second electronic device. In addition, because the voice assistant of the second electronic device is currently in the silent mode, it can be learned from the foregoing description of the silent mode that when the voice assistant is in the silent mode, the voice assistant does not respond to the received instruction. To enable the voice assistant of the second electronic device to execute the second instruction in the silent mode, the voice assistant of the robot may add, to the fourth broadcast message, an identifier that instructs to respond to the second instruction, so that the voice assistant of the second electronic device can execute the second instruction in the silent mode.

For example, the voice assistant of the robot determines that the mobile phone executes the first task, and the voice assistant of the robot adds, to the fourth broadcast message, the second instruction, an identifier of the mobile phone, and an identifier used to instruct the mobile phone to respond to the second instruction, and sends the fourth broadcast message.

The identifier of the second electronic device may be obtained by the voice assistant of the robot from the cloud server. For example, an electronic device in the home may upload a device identifier of the electronic device to the cloud server in advance. It is assumed that the electronic device in the home and the robot share a same cloud account. In this case, the voice assistant of the robot may synchronize the device identifier of the electronic device in the home from the cloud server to a local device.

The identifier of the second electronic device may be, for example, a device ID of the second electronic device.

In addition, the robot may further send the second instruction in the following manner:

For example, the robot may first establish a Bluetooth connection to the second electronic device or establish a connection such as a wireless-fidelity (Wireless-Fidelity, Wi-Fi) direct connection to the second electronic device. After the connection is established, the voice assistant of the robot sends, to the voice assistant of the second electronic device, a packet that includes the second instruction and an identifier that instructs to respond to the second instruction.

In step 408, after obtaining the second instruction, the second electronic device executes the first task requested by the second instruction. For example, when obtaining the fourth broadcast message, the voice assistant of the mobile phone determines, based on the identifier of the mobile phone that is carried in the fourth broadcast message, that the fourth broadcast message is sent to the voice assistant of the mobile phone. Further, the voice assistant of the mobile phone executes, based on the identifier that is carried in the fourth broadcast message and that is used to instruct to respond to the second instruction, the first task requested by the second instruction. For example, the second instruction requests to play the song 1, and the mobile phone plays the song 1 after receiving the fourth broadcast message.

In this application, the robot may freely move in the home or move with the user. In this case, the method 400 may further include:

Step 409: The robot sends a third broadcast message, where the third broadcast message carries a name of an area in which the robot is located in the home after the movement.

After the robot moves in the home, the robot may determine, by using an indoor positioning technology, the area in which the robot is located in the home after the movement of the robot, and notify an electronic device in the home of the name of the area in which the robot is located in the home environment after the movement of the robot. For a method for determining, by the robot, the name of the area in which the robot is located in the home environment after the movement of the robot, refer to related descriptions in step 403. For brevity, details are not described herein again.

After the area in which the robot is located in the home after the movement is determined, the robot may send the third broadcast message, where the third broadcast message carries the name of the area in which the robot is located in the home after the movement.

After the robot sends the third broadcast message, the electronic devices such as the mobile phone, the tablet, the television, and the sound box may receive the third broadcast message. Based on the third broadcast message, the electronic devices such as the mobile phone, the tablet, the television, and the sound box may obtain the name of the area in which the robot is located in the home after the movement.

In addition, the robot may further upload, to the cloud server, the name of the area in which the robot is located in the home after the movement. It is assumed that an electronic device in the home and the robot share a same cloud account. In this case, the electronic device in the home may synchronize, from the cloud server to a local device, the name of the area in which the robot is located in the home after the movement.

Step 410: An electronic device in the home controls, based on the name of the area in which the electronic device in the home is located and the name of the area in which the robot is located in the home after the movement, a voice assistant of the electronic device to enter the working mode from the silent mode.

For example, as shown in (c) in FIG. 3, the robot moves from the living room to the bedroom following the user. In this case, after the robot determines, by using an indoor positioning technology, that the robot is located in the bedroom in the home after the movement, the robot adds, to the third broadcast message sent by the robot, the name of the area (namely, the bedroom) in which the robot is located in the home after the movement. The bedroom herein corresponds to the second area.

The electronic device in the home may determine, based on the name of the area in which the electronic device is located in the home and the name of the area in which the robot is located in the home after the movement, whether the electronic device is located in the same area as the robot, and if the electronic device determines that the electronic device and the robot are located in different areas, the electronic device may enable the voice assistant of the electronic device to enter the working mode.

For example, as shown in (c) in FIG. 3, the robot is located in the bedroom after the movement, and the mobile phone and the tablet are currently located in the living room. Therefore, the mobile phone and the tablet determine, based on a name of an area in which the mobile phone and the robot are located in the home and a name of an area in which the robot is located in the home, that the mobile phone, the tablet, and the robot are located in different regions. In this case, the mobile phone and the tablet may control respective voice assistants of the mobile phone and the tablet to enter the working mode from the silent mode, so that when an electronic device in the living room subsequently receives an instruction triggered by a voice of the user, the electronic device in the living room may respond to the instruction triggered by the voice of the user.

With reference to the scenario in FIG. 5, the following describes, by using an example in which a first electronic device is a robot, another embodiment of a voice interaction method provided in this application. FIG. 6 is an example interaction flowchart of a voice interaction method 500.

Step 501: The robot constructs a map. A home environment in step 501 is shown in FIG. 5(*a*). For a method for constructing the map by the robot in step 501, refer to related descriptions in step 401. For brevity, details are not described herein again.

Step 502: The robot sends a second broadcast message, where the second broadcast message carries map information. For specific details of step 502, refer to related descriptions in step 402. For brevity, details are not described herein again.

Step 503: The robot sends a first broadcast message, where the first broadcast message carries coordinates corresponding to a current location of the robot in the home and information about a communication range, and the communication range is a range in which the robot can normally communicate with an electronic device in the home.

In addition to notifying an electronic device in the home of the map information of the home environment, the robot may further periodically determine, by using an indoor positioning technology, coordinates on the map that correspond to the current location of the robot in the home, and notify the electronic device in the home of the coordinates on the map that correspond to the current location of the robot in the home environment and the information about the communication range.

For example, the robot determines, by using an indoor positioning technology, the coordinates on the map that correspond to the location of the robot in the home. After determining the coordinates on the map that correspond to the current location of the robot in the home, the robot may send the first broadcast message, where the first broadcast message carries the coordinates on the map that correspond to the current location of the robot in the home.

After the robot sends the first broadcast message, the electronic devices such as the mobile phone, the tablet, the television, and the sound box may receive the first broadcast message. Based on the first broadcast message, the electronic devices such as the mobile phone, the tablet, the television, and the sound box may obtain the coordinates on the map that correspond to the current location of the robot in the home.

The robot may further add the information about the communication range to the first broadcast message. For example, the information about the communication range may indicate that the communication range is an area corresponding to a circle with the robot as a center and a preset radius.

In addition, the robot may further upload, to the cloud server, the coordinates on the map that correspond to the current location of the robot in the home. It is assumed that an electronic device in the home and the robot share a same cloud account. In this case, the electronic device in the home may synchronize, from the cloud server to a local device, the coordinates on the map that correspond to the current location of the robot in the home.

Similarly, the robot may further upload the information about the communication range to the cloud server. It is assumed that the electronic device in the home and the robot share the same cloud account. In this case, the electronic device in the home may synchronize the information about the communication range from the cloud server to the local device.

Step 504: The electronic device in the home determines coordinates corresponding to a location of the electronic device in the home.

The electronic device in the home may determine, by using an indoor positioning technology, the coordinates on the map that correspond to the current location of the electronic device in the home. For example, the electronic device determines, by using the indoor positioning technology, the coordinates on the map that correspond to the location of the electronic device in the home.

Step 505: The electronic device in the home controls, based on the coordinates on the map that correspond to the location of the electronic device in the home, the coordinates on the map that correspond to the location of the robot in the home, and the information about the communication range, a voice assistant of the electronic device to enter a silent mode.

The electronic device in the home may determine a distance between the electronic device and the robot based on the coordinates on the map that correspond to the location of the electronic device in the home and the coordinates on the map that correspond to the current location of the robot in the home. Then, with reference to the information about the communication range, the electronic device in the home may determine whether the electronic device is currently located within the communication range. If the electronic device in the home determines that the electronic device is located within the communication range, the electronic device may control the voice assistant of the electronic device to enter the silent mode. The robot and the electronic device in the home are equipped with a same voice assistant. For example, the robot and the electronic device in the home are equipped with a voice assistant of a same manufacturer. Therefore, when the voice assistant of the electronic device in the home and located within the communication range is in the silent mode, if the user gives a "voice for a voice assistant" within the communication range, the electronic device in the home within the communication range does not respond to the instruction. It should be noted that, in this embodiment of this application, it is assumed that when the user gives a "voice for a voice assistant" within the communication range, the voice assistant of the electronic device and the voice assistant of the robot that are located within the communication range may receive an instruction triggered by the voice of the user. In addition, an electronic device in the home and located outside the communication range may also receive the instruction triggered by the voice of the user. This is not limited in this application.

For example, the information about the communication range indicates that the communication range is an area in a circle with the robot as a center and a radius of 5 meters. As shown in FIG. 5(*b*), the robot is currently located in the living room, and the living room herein corresponds to the first area. In this case, the communication range is shown in FIG. 5(*b*). It can be learned from the figure that the television and the tablet are currently located within the communication range, and the mobile phone and the sound box are currently located outside the communication range. Therefore, the television and the tablet may determine, based on coordinates corresponding to a location of the television and a location of the tablet in the home, the coordinates on the map that correspond to the current location of the robot in the home, and the information about the communication range, that the television and the tablet each are located within the communication range. In this case, the television and the tablet may control respective voice assistants of the television and the tablet to enter the silent mode.

Step 506: The robot receives a first instruction triggered by the voice of the user, where the first instruction requests to execute a first task.

Step 507: The robot sends, according to the second instruction triggered by the voice of the user, a second instruction to a second electronic device in the electronic devices in the home, where the second instruction requests the second electronic device to execute the first task. Correspondingly, the second electronic device receives the second instruction from the robot.

Step 508: The second electronic device executes the first task according to the second instruction. For specific details of step 508, refer to related descriptions in step 408 in the method 400. For brevity, details are not described herein again.

In step 507, it is assumed that the user gives a "voice for a voice assistant" within the communication range. After obtaining the first instruction triggered by the voice of the user, the voice assistant of the robot determines, based on the first instruction, that the second electronic device within the communication range executes the first task, and sends the second instruction to the second electronic device. The following separately describes several manners in which the voice assistant of the robot determines the second electronic device that executes the first task.

Manner 1: The voice assistant of the robot determines, based on the first instruction, the second electronic device that executes the first task.

For example, the user gives a voice "Please play a song 1" within the communication range. In this case, the voice assistant of the robot may determine, based on the first instruction triggered by the voice of the user, that the first task needs to be executed by an electronic device having an audio playing capability. Further, the voice assistant of the robot may determine whether an electronic device having an audio playing capability exists within the current communication range.

For example, the voice assistant of the robot may view the electronic device within the communication range on the constructed map of the home environment. It can be learned from FIG. 5(*b*) that currently, there are a mobile phone and a tablet within the communication range. Therefore, the voice assistant of the robot may determine, by using the map of the home environment, that there are electronic devices having an audio playing capability within the communication range, and the electronic devices are respectively the mobile phone and the tablet. The voice assistant of the robot may select one from the mobile phone and the tablet as an electronic device for playing a song.

For example, the voice assistant of the robot considers that sound quality of the mobile phone is better, and determines that the mobile phone executes the first task, that is, the mobile phone plays the song 1. In this case, the second electronic device is the mobile phone.

In addition, the voice assistant of the robot may alternatively select any electronic device from the mobile phone and the tablet as the second electronic device for executing the first task. This is not limited in this application. For example, the voice assistant of the robot determines that the tablet executes the first task. In this case, the second electronic device is the tablet.

It should be noted that, if the voice assistant of the robot does not find, on the map, an electronic device having an audio playing capability, the voice assistant of the robot may prompt the user that currently, there is no electronic device having an audio playing capability within the communication range, and then the voice assistant of the robot may perform a corresponding operation according to a further instruction of the user.

Manner 2: The voice assistant of the robot determines, based on a name of the second electronic device carried in the first instruction, the second electronic device that executes the first task.

For example, the user gives a voice "Please play an animation 1 on the tablet" within the communication range. In this case, the voice assistant of the robot may determine, based on the first instruction triggered by the voice of the user, that the first task needs to be executed by the tablet. Further, the voice assistant of the robot may determine whether the tablet exists within the current communication range.

For example, the voice assistant of the robot may view the electronic device within the communication range on the constructed map of the home environment. It can be learned from FIG. 5(*b*) that the tablet is placed within the communication range. Therefore, the voice assistant of the robot may determine, by using the map of the home environment, that the tablet is placed within the communication range. In this case, the voice assistant of the robot may use the tablet as an electronic device for playing the animation 1. In this case, the second electronic device is the tablet.

It should be noted that, if the voice assistant of the robot does not find the tablet on the map, the voice assistant of the robot may prompt the user that currently the tablet does not exist within the communication range, and then the voice assistant of the robot may perform a corresponding operation according to a further instruction of the user.

Manner 3: The voice assistant of the robot determines, based on a reference message and the first instruction, the second electronic device that executes the first task.

For example, the user gives a voice "How to get to the World Horticultural Exposition garden" within the communication range. After receiving the first instruction, the voice assistant of the robot may determine, based on the first instruction triggered by the voice of the user, that the first task needs to be executed by an electronic device having a display function. Further, the voice assistant of the robot may determine whether an electronic device having a display function exists within the current communication range.

For example, the voice assistant of the robot may view the electronic device within the communication range on the constructed map of the home environment. It can be learned from FIG. 5(*b*) that the mobile phone and the tablet are placed within the communication range. Therefore, the voice assistant of the robot may determine, by using the map of the home environment, that there are electronic devices having a display function within the communication range, and the electronic devices are respectively the mobile phone and the tablet. The voice assistant of the robot may select one from the mobile phone and the tablet as the second electronic device for executing the first task.

When determining the second electronic device that executes the first task, the voice assistant of the robot may obtain reference information, and determine, based on the reference information, the second electronic device that executes the first task, where the reference information may include body movement information of the user and/or point of regard information of the user.

For example, in an implementation, the voice assistant of the robot obtains at least one frame of image about the home environment by using a camera. After analyzing the obtained image, it is assumed that the voice assistant of the robot determines that a finger of the user is currently in a state of pointing to the mobile phone. In this case, the reference information obtained by the voice assistant of the robot is body movement information of the user. Based on the body movement information of the user, the voice assistant of the robot may determine that the mobile phone executes the first task, to be specific, the mobile phone displays a corresponding route to the user. In this case, the second electronic device is the mobile phone.

In another implementation, the voice assistant of the robot obtains at least one frame of image about the home environment by using a camera. After analyzing the obtained image, it is assumed that the voice assistant of the robot determines that a point of regard of the user currently falls on the tablet. In this case, the reference information obtained by the voice assistant of the robot is point of regard information of the user. Based on the point of regard information of the user, the voice assistant of the robot may determine that the tablet executes the first task, to be specific, the tablet displays a corresponding route to the user. In this case, the second electronic device is the tablet.

In still another implementation, the voice assistant of the robot obtains at least one frame of image about the home environment by using a camera. After analyzing the obtained image, it is assumed that the voice assistant of the robot determines that a point of regard of the user currently falls on the tablet and determines that a finger of the user is currently in a state of pointing to the tablet. In this case, the reference information obtained by the voice assistant of the robot is point of regard information of the user and body movement information of the user. Based on the point of regard information of the user and the body movement information of the user, the voice assistant of the robot may determine that the tablet executes the first task, to be specific, the tablet displays a corresponding route to the user. In this case, the second electronic device is the tablet.

It should be noted that, if the voice assistant of the robot does not find, on the map, an electronic device having a display function, the voice assistant of the robot may prompt the user that currently, there is no electronic device having a display function within the communication range, and then the voice assistant of the robot may perform a corresponding operation according to a further instruction of the user.

After the second electronic device that executes the first task is determined, the voice assistant of the robot may send the second instruction to the second electronic device. For specific descriptions of sending the second instruction by the voice assistant of the robot to the second electronic device, refer to related descriptions in step 407 in the method 400. For brevity, details are not described herein again.

In this application, the robot may freely move in the home or move with the user. In this case, the method 500 may further include:

Step 509: The robot sends a third broadcast message, where the third broadcast message carries coordinates corresponding to a location after the movement of the robot in the home.

After the robot moves in the home, the robot may determine, by using an indoor positioning technology, the coordinates on the map that correspond to the location after the movement of the robot in the home, and notify an electronic device in the home of the coordinates on the map that correspond to the location after the movement of the robot in the home environment. For a method for determining, by the robot, the coordinates that correspond to the location after the movement of the robot in the home environment, refer to related descriptions in step 503. For brevity, details are not described herein again.

After the coordinates on the map that correspond to the location after the movement of the robot in the home is determined, the robot may send the third broadcast message, where the third broadcast message carries the coordinates on the map that correspond to the location after the movement of the robot in the home.

After the robot sends the third broadcast message, the electronic devices such as the mobile phone, the tablet, the television, and the sound box may receive the third broadcast message. Based on the third broadcast message, the electronic devices such as the mobile phone, the tablet, the television, and the sound box may obtain the coordinates on the map that correspond to the location after the movement of the robot in the home.

In addition, the robot may further upload, to the cloud server, the coordinates on the map that correspond to the location after the movement of the robot in the home. It is assumed that an electronic device in the home and the robot share a same cloud account. In this case, the electronic device in the home may synchronize, from the cloud server to a local device, the coordinates on the map that correspond to the location after the movement of the robot in the home.

Step 510: The electronic device in the home controls, based on the coordinates on the map that correspond to the location of the electronic device in the home, the coordinates on the map that correspond to the location after the movement of the robot in the home, and the information about the communication range, the voice assistant of the electronic device to enter the working mode from the silent mode.

The electronic device in the home may determine a distance between the electronic device and the robot based on the coordinates on the map that correspond to the location of the electronic device in the home and the coordinates on the map that correspond to the location after the movement of the robot in the home. Then, with reference to the information about the communication range, the electronic device in the home may determine whether the electronic device is currently located within the communication range. If the electronic device in the home determines that the electronic device is located outside the communication range, the electronic device may control the voice assistant of the electronic device to enter the working mode from the silent mode.

For example, the information about the communication range indicates that the communication range is an area in a circle with the robot as a center and a radius of 5 meters. As shown in FIG. 5(c), the robot moves to the bedroom, and the bedroom herein corresponds to the second area. In this case, the communication range is shown in FIG. 5(c). It can be learned from the figure that the television and the tablet are currently located outside the communication range. Therefore, the television and the tablet may determine, based on coordinates on the map that correspond to a location of the television and a location of the tablet in the home, the coordinates on the map that correspond to the location after the movement of the robot in the home, and the information about the communication range, that the television and the tablet are located outside the communication range. In this case, the television and the tablet may control respective voice assistants of the television and the tablet to enter the working mode from the silent mode, so that when an electronic device located outside the communication range subsequently receives an instruction triggered by a voice of the user, the electronic device located outside the communication range may respond to the instruction triggered by the voice of the user.

It should be noted that the method 400 and the method 500 are merely used as examples for description, and do not constitute a limitation on this application. For example, in specific implementation, the working mode of the voice assistant of the electronic device in the home may be manually set by the user. In other words, the user may set the working mode of the voice assistant of the electronic device in the home to the silent mode or the working mode according to an actual requirement. In this case, step 401 to step 405 in the method 400 may not be mandatory, and similarly, step 501 to step 505 in the method 500 may not be mandatory steps.

In addition, in this embodiment of this application, the robot may further construct the map of the home environment based on a visual simultaneous localization and mapping (visual simultaneous localization and mapping, vSLAM) technology. In this case, a camera may be configured on the robot, and the robot may label the map in a map construction process through image semantic understanding.

In this embodiment, the electronic device may be divided into function modules based on the foregoing method examples. For example, each function module corresponding to each function may be obtained through division, or two or more functions may be integrated into one processing module. The integrated module may be implemented in a form of hardware. It should be noted that, in embodiments, division into the modules is an example, and is merely logical function division. During actual implementation, another division manner may be used.

It should be noted that all related content of the steps in the foregoing method embodiments may be cited in function description of corresponding functional modules. Details are not described herein again.

The electronic device provided in this embodiment is configured to perform the foregoing voice interaction method, and therefore, can achieve same effect as the foregoing implementation method. When an integrated unit is used, the electronic device may include a processing module, a storage module, and a communications module. The processing module may be configured to control and manage actions of the electronic device, for example, may be configured to support the electronic device in performing the steps performed by the processing unit. The storage module may be configured to support the electronic device to store program code, data, and the like. The communications module may be configured to support communications between the electronic device and another device.

The processing module may be a processor or a controller. The processor may implement or execute various example logical blocks, modules, and circuits described with reference to content disclosed in this application. The processor may alternatively be a combination for implementing a computing function, for example, a combination including one or more microprocessors or a combination of a digital signal processor (digital signal processing, DSP) and a microprocessor. The storage module may be a memory. The communication module may be specifically a device, for example, a radio frequency circuit, a Bluetooth chip, or a Wi-Fi chip, that interacts with another electronic device.

In an embodiment, when the processing module is a processor and the storage module is a memory, the electronic device in this embodiment may be a device in the structure shown in FIG. 2.

An embodiment further provides a computer-readable storage medium. The computer-readable storage medium stores computer instructions, and when the computer instructions are run on an electronic device, the electronic device is enabled to perform the foregoing related method steps to implement the voice interaction method in the foregoing embodiment.

An embodiment further provides a computer program product. When the computer program product is run on a computer, the computer is enabled to perform the foregoing related steps, to implement the voice interaction method in the foregoing embodiment.

In addition, an embodiment of this application further provides an apparatus. The apparatus may be specifically a chip, a component, or a module. The apparatus may include a processor and a memory that are connected to each other. The memory is configured to store computer-executable instructions. When the apparatus runs, the processor may execute the computer-executable instructions stored in the memory, so that the chip performs the voice interaction method in the foregoing method embodiment.

The electronic device, the computer storage medium, the computer program product, or the chip provided in embodiments is configured to perform the corresponding method provided above. Therefore, for beneficial effects that can be achieved, refer to the beneficial effects of the corresponding method provided above. Details are not described herein again.

Based on the foregoing descriptions of the implementations, a person skilled in the art may understand that for the purpose of convenient and brief description, division into the foregoing functional modules is merely used as an example for illustration. During actual application, the foregoing functions can be allocated to different functional modules for implementation based on a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or division into the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in embodiments of this application. The foregoing storage medium includes any medium that can store program code, for example, a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
obtaining map information comprising a layout of a plurality of areas; and
obtaining, based on the map information, current location information of a first electronic device of a plurality of electronic devices;
receiving a first instruction triggered by a voice of a user, wherein:
the first instruction is received by the first electronic device,
the first electronic device and a second electronic device of the plurality of electronic devices are located in a first area of the plurality of areas,
the plurality of electronic devices each comprise respective instances of a voice assistant,
the respective instances of the voice assistant of the plurality of electronic devices other than the first electronic device are in a silent mode when the first instruction is received, and
the first instruction requests to execute a first task; and
sending, by the first electronic device, a second instruction to the second electronic device according to the first instruction, wherein the second instruction requests the second electronic device to execute the first task.

2. The method according to claim 1, further comprising:
obtaining reference information, wherein:
the reference information indicates that the user expects the second electronic device to execute the first task, and
sending the second instruction to the second electronic device according to the first instruction comprises:
sending the second instruction to the second electronic device according to the first instruction and the reference information.

3. The method according to claim 2, wherein the reference information comprises body movement information of the user or point of regard information of the user.

4. The method according to claim 1, wherein the first instruction carries a name of the second electronic device.

5. The method according to claim 1, further comprising:
sending a first broadcast message to the second electronic device, wherein the first broadcast message carries the current location information of the first electronic device.

6. The method according to claim 5, wherein the current location information comprises a first name of the first area in which the first electronic device is currently located or coordinates corresponding to a current location of the first electronic device.

7. The method according to claim 6, wherein when the current location information comprises the coordinates corresponding to the current location of the first electronic device, the first broadcast message further carries information about a communication range corresponding to the first electronic device.

8. The method according to claim 1, further comprising:
sending a second broadcast message to the second electronic device, wherein the second broadcast message carries the map information.

9. The method according to claim 1, wherein the first electronic device is movable, and the method further comprises:
after the first electronic device is moved to a second area of the plurality of areas, obtaining, based on the map information, location information of the first electronic device after the movement; and
sending a third broadcast message, wherein the third broadcast message carries the location information of the first electronic device after the movement, and wherein the location information after the movement comprises a second name of the second area in which the first electronic device is located after the movement or coordinates corresponding to a location after the movement of the first electronic device.

10. The method according to claim 1, wherein the map information comprises a layout of the plurality of electronic devices in the plurality of areas.

11. A method, comprising:
obtaining first current location information of a first electronic device of a plurality of electronic devices and second current location information of a second electronic device of the plurality of electronic devices, wherein the first electronic device and the second electronic device are located in a first area, and the plurality of electronic devices each comprise respective instances of a voice assistant; and
controlling, based on the first current location information of the first electronic device and the second current location information of the second electronic device, the respective instance of the voice assistant of the second electronic device to enter a silent mode;
obtaining a second instruction from the first electronic device of the plurality of electronic devices, wherein:
the second instruction is received by the second electronic device of the plurality of electronic devices,
the respective instances of the voice assistant of the plurality of electronic devices other than the first electronic device are in the silent mode when the second instruction is obtained,
the second instruction requests the second electronic device to execute a first task,
the second instruction is sent by the first electronic device according to a first instruction, and
the first instruction requests to execute the first task; and
executing, by the second electronic device, the first task according to the second instruction.

12. The method according to claim 11, wherein:
the first current location information of the first electronic device comprises a name of the first area in which the first electronic device is currently located,
the second current location information of the second electronic device comprises the name of the first area in which the second electronic device is currently located, and wherein controlling, based on the first current location information of the first electronic device and the second current location information of the second electronic device, the respective instance of the voice assistant of the second electronic device to enter the silent mode comprises:

controlling the respective instance of the voice assistant of the second electronic device to enter the silent mode based on the second electronic device being located in the first area.

13. The method according to claim 11, wherein the method further comprises:

obtaining communication range information corresponding to the first electronic device; and controlling, based on the first current location information of the first electronic device and the second current location information of the second electronic device, the respective instance of the voice assistant of the second electronic device to enter the silent mode comprises:

controlling, based on the first current location information of the first electronic device, the second current location information of the second electronic device, and the communication range information corresponding to the first electronic device, the respective instance of the voice assistant of the second electronic device to enter the silent mode.

14. The method according to claim 13, wherein:

the first current location information of the first electronic device comprises first coordinates corresponding to the first current location of the first electronic device, the second current location information of the second electronic device comprises second coordinates corresponding to the second current location of the second electronic device, and wherein controlling, based on the first current location information of the first electronic device, the second current location information of the second electronic device, and the communication range information corresponding to the first electronic device, the respective instance of the voice assistant of the second electronic device to enter the silent mode comprises:

determining a distance between the first electronic device and the second electronic device based on the first coordinates corresponding to the first current location of the first electronic device and the second coordinates corresponding to the second current location of the second electronic device;

determining, based on the distance and the communication range information corresponding to the first electronic device, whether the second electronic device is located within a communication range corresponding to the first electronic device; and when the second electronic device is located within the communication range corresponding to the first electronic device, controlling the respective instance of the voice assistant of the second electronic device to enter the silent mode.

15. The method according to claim 13, wherein obtaining the communication range information corresponding to the first electronic device comprises:

receiving a first broadcast message from the first electronic device, wherein the first broadcast message comprises the communication range information corresponding to the first electronic device; and obtaining, based on the first broadcast message, the communication range information corresponding to the first electronic device.

16. The method according to claim 11, wherein obtaining the first current location information of the first electronic device comprises:

receiving a first broadcast message from the first electronic device, wherein the first broadcast message carries the first current location information of the first electronic device; and obtaining the first current location information of the first electronic device based on the first broadcast message.

17. The method according to claim 11, wherein obtaining the second current location information of the second electronic device comprises:

obtaining map information, wherein the map information comprises map information of the first area; and obtaining the second current location information of the second electronic device based on the map information.

18. The method according to claim 17, wherein obtaining the map information comprises:

receiving a second broadcast message from the first electronic device, wherein the second broadcast message comprises the map information.

19. The method according to claim 11, further comprising:

after the first electronic device is moved to a second area, obtaining location information of the first electronic device after the movement; and controlling, based on the location information of the first electronic device after the movement and the second current location information of the second electronic device, the respective instance of the voice assistant of the second electronic device to enter a working mode from the silent mode.

20. The method according to claim 17, wherein the map information comprises a layout of the plurality of electronic devices in a plurality of areas.

* * * * *